(No Model.)
F. REYNOLDS.
APPARATUS FOR PURIFYING WATER.
No. 547,680. Patented Oct. 8, 1895.
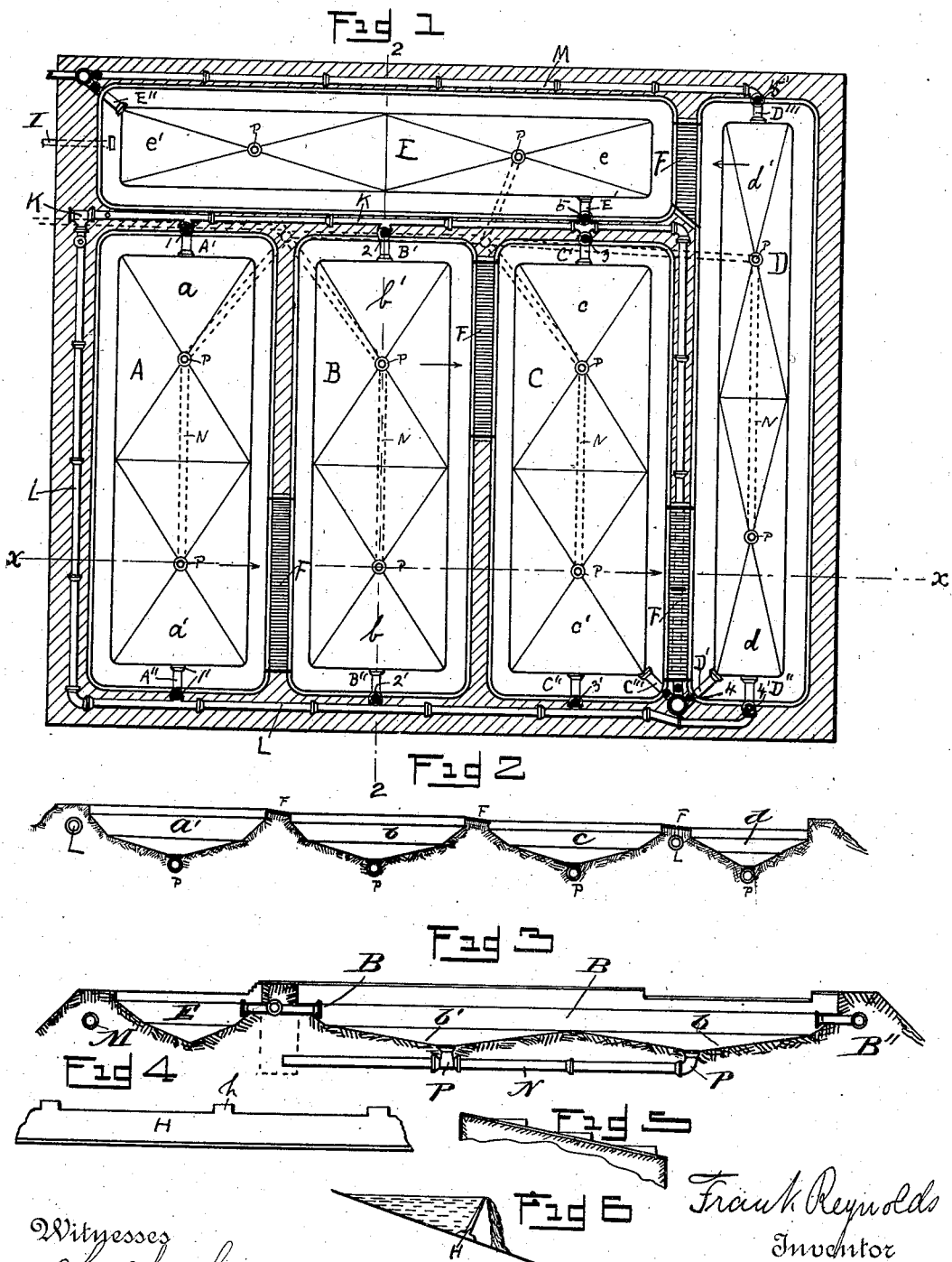

UNITED STATES PATENT OFFICE.

FRANK REYNOLDS, OF OMAHA, NEBRASKA, ASSIGNOR OF ONE-HALF TO ALONZO B. HUNT, OF SAME PLACE.

APPARATUS FOR PURIFYING WATER.

SPECIFICATION forming part of Letters Patent No. 547,680, dated October 8, 1895.

Application filed August 29, 1891. Serial No. 404,150. (No model.)

*To all whom it may concern:*

Be it known that I, FRANK REYNOLDS, of Omaha, in the county of Douglas and State of Nebraska, have invented certain useful Improvements in Apparatus for Purifying Water; and I do hereby declare that the following is a full, clear, and exact description of the invention, such as will enable others skilled in the art to which it appertains to make and use the same, reference being had to the accompanying drawings, which form a part of this specification.

This invention has relation to a new and useful method and apparatus for purifying and clarifying water.

The object of this invention is to provide an efficient and economical method and apparatus, more especially adapted for the use of cities, whereby impure, sandy, or muddy water may be purified and clarified, as will be described hereinafter and finally pointed out in the claims.

In the accompanying drawings, Figure 1 shows a top view, partly sectional, of a battery of basins and their connections as used in my improved method of purifying the water. Fig. 2 shows a sectional elevation on the line $x\ x$; Fig. 3, a sectional elevation on the line $z\ z$. Fig. 4 shows a front detail of one of the weir-boards. Fig. 5 is an end elevation thereof; and Fig. 6, a detail view of the weir, showing the arrangement of the weir-boards.

Similar letters and numerals of reference refer to corresponding parts.

In arranging my apparatus I provide a battery, preferably of five basins, which, when arranged to supply cities, are of suitable masonry and built within the ground. Four of these basins or reservoirs are placed in juxtaposition and facing in the same direction, as shown, for instance, in Fig. 1, where I have marked these basins A, B, C, and D. The fourth basin (marked D) is slightly larger than those marked A, B, and C, extending beyond, so that this basin may empty into a fifth or final reservoir E, which preferably ranges along one end of the three shorter basins, (marked A, B, and C,) as shown in Fig. 1.

In the drawings I have shown a battery of five basins, but of course a greater or less number could be used. These basins are constructed according to any improved method, but they are preferably dished at two points, as shown in Figs. 1 and 3, so as to divide each basin at the bottom into two settling-chambers, as illustrated. When the basins have been properly constructed, they are connected by a series of aerating-weirs, as shown at F F F F. These weirs are of a suitable width and upon an incline and placed at the sides at opposite ends, so that the water enters the basin above one settling-chamber and leaves it above the other, as will be understood by referring to Fig. 1. The aerating-weir comprises a series of weir-boards H, (shown in Figs. 4 and 5,) which are set slightly at an angle upon the inclined weir, so that the water passing over the weir-boards washes over an air-cushion or bed, as shown in Fig. 6. The weir-boards extend beyond the weir proper, so that the air may freely circulate beneath the flowing water. To further facilitate the circulation of the air beneath the water, I provide the weir-boards with a series of lips $h$, which extend beyond the body of the board and thus divide the flowing water into a number of small falls. In the passage from one basin to another any suitable number of these weir-boards may be employed. In arranging them I place them far enough apart so that the water passes a considerable distance over the weir in a thin sheet, which is, of course, wind-swept before it floods over the boards H.

When the basins have been properly constructed and connected by means of the aerating-weirs, as shown in Fig. 1, the operation of my system of purifying and clarifying would be as follows: The water to be purified is led or pumped into the basin A, so as to first enter the settling-chamber $a$, and after flooding this shallow chamber would flow into the one $a'$ adjoining and finally flood the whole basin, the overflow passing over the weir F into the basin B, above the settling-chamber $b$. This basin would be flooded, as in the previous case, the water escaping over the weir above the chamber $b'$ into the basin marked C, from thence into the one marked D, and finally into the reservoir E, as indicated by the arrows, from whence it would be drawn through the main I, freed of all its impurities. It will be noticed that only the clearest (the surface water) is permitted to escape. In order to guard against any break in one of the basins, incapacitating the whole system, I provide a system of mains K, L, and M, communicating with all the basins. The main K enters the basins A, B, C, D, and E by means of the T's A', B', C', D', and E', the main L communicating with but the basins A, B, C and D by means of the T's A'', B'', C'', and D'', and the main M communicating with the basins D and E by means of T's D''' and E''. At a convenient point each T is provided with a valve 1 1', 2 2', 3 3', 4 4', and 5 5', the basin C being provided with the T C'''. Now, if through any accident one of the basins should get out of repair or it becomes necessary to clean it, it may be almost instantly disconnected or cut out without affecting the rest of the system. If, for the sake of an illustration, the basin marked C should become defective or inoperative, it could be promptly "cut out" by first opening the valve 2' within the T B'' of the basin B. This T, being lower than the weir, would promptly permit the escape of the water by means of this new way, and then by opening the valve 4' within the T D'' it would enter the basin D above the chamber d. The basin C would thus be "still." Within the center of each of the settling-chambers I provide a suitable hydraulic exhaust P in connection with a separate system of pipes N, as shown in dotted lines in Fig. 1, by means of which the water, as well as the collected deposit, may be drawn from the basins.

By the arrangement of my system of pipes any one or more of the basins may be cut out.

Having thus described my said invention, and the best means I know of operating the same, what I claim as new, and desire to secure by United States Letters Patent, is—

1. In an apparatus for clarifying and purifying water, the combination of a battery of communicating basins, each basin having its bottom divided into two settling chambers, valved washout pipes within said chambers, aerating inlet and escape weirs connecting said basins, and placed at the sides and at opposite ends, so that the water enters the basin above one settling chamber and leaves above the other, said aerating weirs comprising a declining plane, having a series of weir boards set at an angle to the perpendicular so as to provide an air bed, each board being provided with a series of upwardly extending lips to interrupt the water flow, and so arranged that the water shall flow in an air swept sheet before being collected and broken by said weir boards, all substantially as and for the purpose set forth.

2. In an apparatus for purifying and clarifying water, the combination and arrangement of a battery of communicating basins, provided with inlet and escape weirs, each basin being set at an elevation slightly higher than the one preceding, said aerating weirs comprising a declining plane, provided with a system of parallel inclined weir boards having a series of upwardly extending lips, all arranged substantially as and for the purpose set forth.

3. In an apparatus for clarifying and purifying water, the combination of a battery of communicating basins, settling chambers within said basins, valved washout pipes within said chambers, aerating inlet and escape weirs connecting said basins, and a system of idle water mains in valve connection with said basins, all arranged substantially as and for the purpose set forth.

4. In an apparatus for clarifying and purifying water, the combination of a battery of communicating basins comprising an in-take and exhaust basin connected by an intermediate series of communicating basins, each basin being further sub-divided into a settling in-take and exhaust section, aerating escape weirs connecting said battery of basins, the exhaust section of one basin emptying into and communicating with the receiving section of the following basin, said aerating weirs dividing the water into shallow wind-swept sheets in passing from said in-take to said exhaust settling sections, and means for filling the first of said battery of basins and exhausting the last of said basins, all arranged substantially as and for the purpose set forth.

In testimony whereof I affix my signature in presence of two witnesses.

FRANK REYNOLDS.

Witnesses:
G. W. SUES,
JOHN SANDS.